March 8, 1949.　　　L. A. WILLIAMS, JR　　　2,464,165
PORTABLE HEATING APPARATUS

Filed Aug. 24, 1942　　　2 Sheets-Sheet 1

Inventor:
Lynn A. Williams Jr.
By Williams, Bradbury & Hinkle
Attys.

March 8, 1949. L. A. WILLIAMS, JR 2,464,165
PORTABLE HEATING APPARATUS
Filed Aug. 24, 1942 2 Sheets-Sheet 2
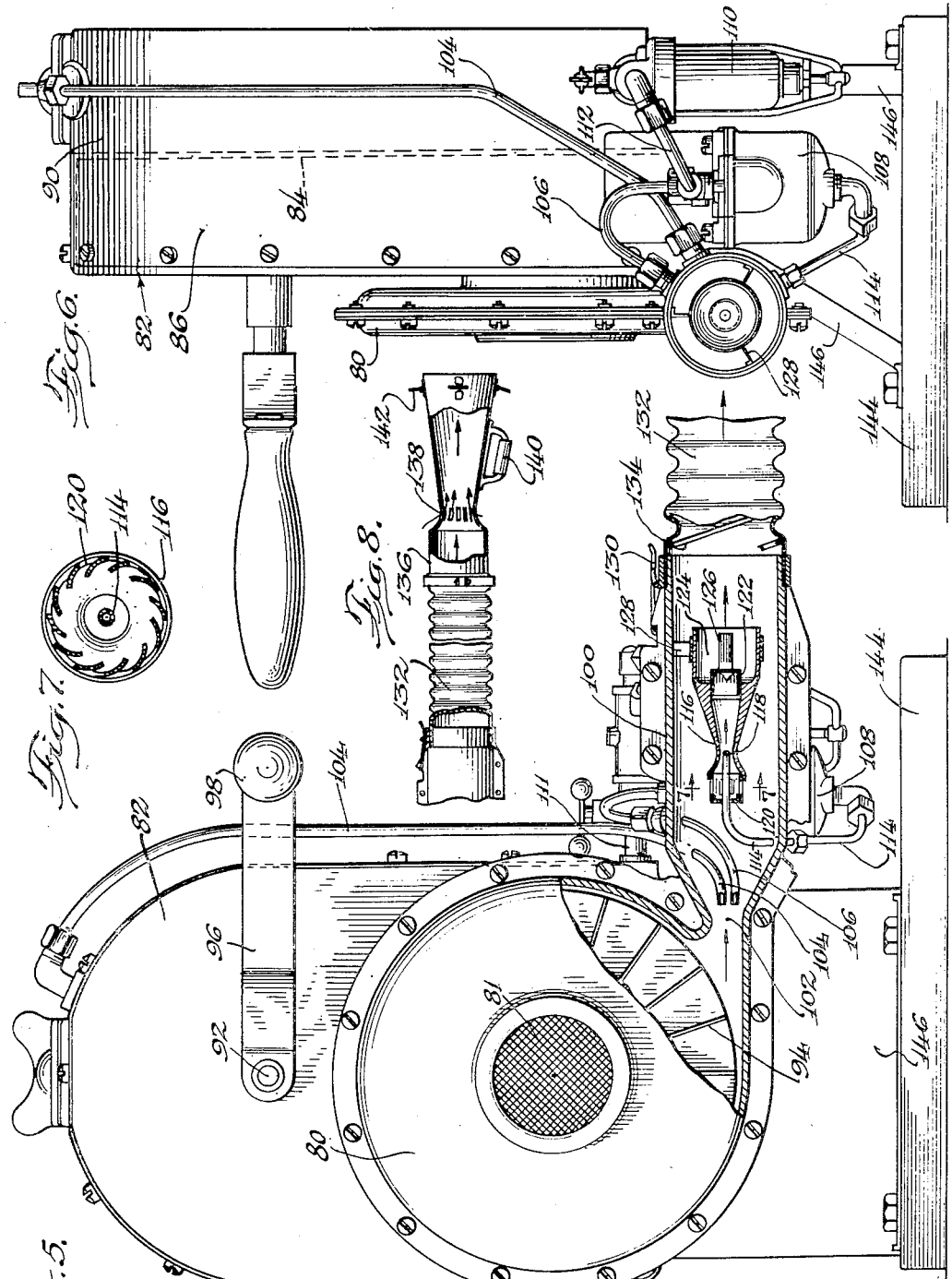

Patented Mar. 8, 1949

2,464,165

UNITED STATES PATENT OFFICE 2,464,165

PORTABLE HEATING APPARATUS

Lynn A. Williams, Jr., Northfield, Ill., assignor to Stewart-Warner Corporation, Chicago, Ill., a corporation of Virginia Application August 24, 1942, Serial No. 455,832

4 Claims. (Cl. 263—19)

1

My invention relates generally to heating apparatus, and more particularly to an improved portable heater adapted for emergency use by the crews of aircraft.

Occasionally, planes are forced to land due to failure of a part of the airplane, which may be repaired to recondition the plane for flight, but if, for example, the forced landing occurs in winter in the Arctic, with prevalent sub-zero temperatures, the engines may have become cooled to atmospheric temperature by the time the necessary repairs have been completed, and it may be very difficult to start them.

It is therefore an object of my invention to provide a small, compact, emergency heating unit which may be carried on the aircraft, and utilized to provide heat to facilitate repair operations and warm up the engines preliminary to starting them.

A further object is to provide a small, portable emergency heater which may be used, by the crew of an airplane which has been forced to land, to cook food and to supply heat for the comfort of the crew, and for other purposes.

A further object is to provide a simple handoperated heating apparatus which may be utilized for thawing out and heating aircraft parts and oil tanks and in general for locally applying blasts of heated air for the rapid heating or drying of various materials and apparatus.

Other objects will appear from the following description, reference being had to the accompanying drawings, in which:

Fig. 1 is a diagrammatic side elevational view of an airplane showing the emergency heater in use;

Fig. 2 is a side elevational view of the heater;

Fig. 3 is a plan view thereof;

Fig. 4 is a fragmentary sectional view taken on the line 4—4 of Fig. 3;

Fig. 5 is a side elevational view, with portions in section, of a modified form of the heating apparatus;

Fig. 6 is a front elevational view of the structure shown in Fig. 5;

Fig. 7 is a fragmentary sectional view taken on the line 7—7 of Fig. 5; and,

Fig. 8 is an elevational view with parts thereof in section showing an improved discharge nozzle for the end of the heated air conveying hose.

The heater comprises a tank 10 for containing the liquid fuel, preferably gasoline, because it is usually readily available, or some other light hydrocarbon fuel. The tank may be filled upon removal of a filling cap 12. The side of the tank is recessed to provide space for a housing 14 of a blower 16, which may be spot-welded, or otherwise suitably secured to the tank 10, as by ears 18. The rotor of the blower 16 is manually driven by a crank 20 detachably secured to a gear 22 fixed to a shaft 24. This shaft is mounted for rotation in suitable bearings formed in extensions 26 of the side walls of the blower casing 14. The gear 22 meshes with a pinion 28 secured to the rotor shaft 30 of the blower 16.

The outlet of the blower is formed by a conduit 32 which may be in part integral with the housing 14, and which contains a carbureting tube 33 of a burner 34. This burner 34 may be of the type more fully disclosed in the copending application of Henry J. DeN. McCollum, Serial No. 437,557, filed April 3, 1942, now Patent #2,410,547. It will be noted, however, that for the sake of simplicity, no electrical ignition means are provided, but instead the burner may be ignited by dropping a lighted match through a small opening 36 leading to a combustion chamber 38.

Fuel is supplied to the carbureting tube 33 through a tube 40, extending to a point near the bottom of the tank 10, and having an opening 42 facing in the direction in which the air flows past it, while a short tube 44 has an opening 46 facing in the direction from which the air is supplied by the blower 16. It will be understood that the blower 16 supplies air for mixture with the combustible fluid in the tube 33, (and which is subsequently burned in the combustion chamber 38), and also supplies air in a stream flowing around the tube 34 and combustion chamber 38, and thereafter through a heat exchanger 48. The provision of the heat exchanger 48 is optional. When it is used, the products of combustion likewise flow through it and may subsequently be mixed with the air supplied to the heat exchanger 48 so as fully to utilize the generated heat.

Whenever the heated air is to be used for heating a cabin, or used for other purposes in which the heated air must be fresh, the heat exchanger 48 must be used and may be provided with a three-way valve 47 which has its inlet port connected to the outlet end of the heat exchanger. One of the two outlet ports of the valve is connected to an exhaust stack 49 which vents the noxious gases to the atmosphere; the other outlet port directs the products of combustion into the heated air stream. The valve 47 is operated by a crank arm 51. When it is unnecessary for the heating apparatus to supply pure heated air, the valve may be set to pass the exhaust gases into the stream of heated air. Of course, if it is not contemplated that this apparatus would be used for cabin heating or for other purposes requiring pure air, the three-way valve may be omitted.

A casing 50 is secured to the outlet end of the conduit 32, and normally contains a collapsed flexible hose 52. This hose may be of a suitable heat resistant fabric reenforced by a coil spring, or the like, so as to maintain its generally cylindrical shape.

The tank 10 is also provided with a wick supporting structure 54, which is suitably secured within the tank 10, and has its adjusting thumb nut 56 extending therefrom, by which the position of a wick 58 may be adjusted. The wick supporting structure 54 is surrounded by a threaded tube 60 which may be welded to the tank 10, and is normally covered by a cap 62 which has wings 64 formed thereon so that the cap may be screwed down tightly against a gasket 66 under normal conditions, and thereby prevent leakage of fuel from the tank 10.

Surrounding the threaded tube 60, is an apertured shield 68 which protects the flame from the wind. Across the top of the shield 68 is a suitable grating structure 70 which may be utilized to support small cooking utensils.

The tank 10 is provided with a suitable handle 72 by which the assembly may be conveniently carried, and is also provided with a clamp bracket 74, which may be either permanently secured to the tank 10 or detachably secured thereto by means of butterfly headed studs 76, the bracket 74 being provided with a suitable screw clamp 78.

The tubes 40 and 44 are preferably of capillary dimensions so that even though the heater assembly is lying on its side, no appreciable amount of fuel will leak therefrom, it being only when the fuel is subjected to a substantial pressure differential, due to the Pitot tube effect, that the fuel will be caused to flow through the tube 40 at any substantial rate. Thus, it will usually not be necessary to provide shut-off valves in these tubes.

When it is desired to heat the engine or other part of an airplane, the flexible hose 52 is withdrawn from its casing 50 and the tank 10 clamped to a convenient part of the airplane by means of the screw clamp 78, whereupon, the operator will commence operating the blower by rotating the crank 20 counterclockwise and will ignite the mixture formed in the burner tube 34, by dropping a lighted match through the opening 36. The mixture will burn in the combustion chamber 38 and flow through the heat exchanger 48 to heat the remainder of the air supplied by the blower 16, the products of combustion being preferably admixed with such air to flow through the hose 52 to the space to be heated. As indicated in Fig. 1, the heater may be used to warm up the engine, the cowl opening of which is preferably suitably covered to prevent rapid escape of the heated air supplied by the heating apparatus.

When the pilot is forced to land in a barren terrain, he may unscrew the cap 64 and ignite the wick 58 and utilize the heat thus attained, to cook food. The wick is preferably of close tight weave of materials suited to the fuel to be used.

In the modification of the invention shown in Figs. 5 to 8, a blower casing 80, having a screened inlet opening 81, is suitably secured to a housing 82, which is divided by partition 84 to form a compartment 86 for speed increasing gearing and a tank 90 for the fuel. The speed increasing gearing connects a shaft 92 with the impeller or rotor 94 of the blower. A crank 96 is secured to the shaft 92 and has a handle 98 swiveled thereto. A heater tube 100 may be formed in two halves integral with the halves of the blower casing 80, there being a discharge port 102 of reduced cross-sectional area connecting the interior of the blower with the space within the heater tube 100. Adjacent this restricted discharge port 102 is located a pair of tubes 104, 106, with their open ends directed into the stream of air flowing through the port 102 so as to be supplied with air under substantial pressure due to the velocity pressure head. The tube 104 is connected to the upper end of the tank 90, while the tube 106 is connected to the upper end of a carburetor float bowl 108. A fuel strainer 110 has its inlet connected to the tank 90 by a pipe 111 to receive fuel therefrom and has its outlet connected to the float bowl 108 by a tube 112.

Fuel is withdrawn from the float bowl 108 by a conduit 114, which extends through the heater tube 100 and into the throat portion of a Venturi-shaped passageway formed in a burner 116. The end of the tube 114 within the burner tube 116 is closed, but is provided with a plurality of radial jet ports 118 of small diameter. The air inlet of the burner tube 116 is provided for by a louvered cap 120, the louvers of which are conformed, as best shown in Fig. 7, to cause the air entering its ports to flow in a spiral helical path. A similar louvered cap 122 is provided at the outlet of the Venturi-shaped passageway through the burner tube 116 so that the mixture of fuel and air flowing into a combustion chamber 124 will be thoroughly mixed therein due to its rotary helical motion.

A reigniter element 126 is secured to the cap 122, as by welding. This reigniter element may be of the construction disclosed in the copending application of H. J. De N. McCollum, Serial No. 410,039, filed September 8, 1941, now Patent #2,396,868.

The burner tube 116 is preferably made of a metal having good heat conducting properties, and is preferably of relatively thick section around the Venturi-shaped passageway so that heat will be conducted from the walls of the combustion chamber portion of this element to the air flowing through the Venturi-shaped passageway to pre-heat the latter and thus improve combustion of the mixture. The burner tube 116 is suitably supported within the heater tube 100 by brackets 128.

Detachably secured to the end of the heater tube 100, as by a snap latch 130, is a collapsible hose 132. This hose 132 is preferably made of a heat resistant fabric which is reinforced by a spiral spring 134, the fabric being impregnated with a suitable composition to make it substantially air-tight.

Secured to the outer end of the discharge hose 132 is a nozzle 136, which has a Venturi-like throat portion provided with apertures 138. The nozzle may be provided with a suitable handle 140 and D-rings 142 for convenience in attaching the nozzle to apparatus to be heated.

The apparatus as a whole is rigidly supported on a base 144 by supporting brackets 146 bolted to the base.

In using the apparatus of Figs. 5 to 8, it is necessary merely to turn the crank 96, whereupon, due to the speed increasing gear train, the blower impeller will be rotated at high speed and draw air through its screened inlet opening 81. The pressure developed at the discharge port 102 is conducted to the top of the fuel tank 90, thus assuring rapid flow of the fuel therefrom through the strainer 110 and into the float bowl 108. The air pressure at the throat 102 is likewise transmitted through the tube 106 to the top of the float bowl to provide pressure for the flow of the fuel therefrom to the low pressure jet orifices 118 formed near the end of the tube 114. As soon as flow of fuel has thus been established by operation of the blower, the hose 132 being removed, the fuel mixture may be ignited by a match. As soon as steady combustion has been attained, the hose 132 may be attached to the heater tube 110. The combustion will take place mainly within the combustion chamber 124, and air flowing around the burner tube 116 will mix with the products of combustion, assuring complete combustion thereof, and the mixture of air with the products of combustion will flow through the hose 132 to the nozzle 136. The nozzle 136 is detachably secured to the end of the hose 132, and is used whenever the blast of air is required to be at a temperature lower than that at which the mixture flows through the hose 132.

Thus, when the nozzle 136 is used, atmospheric air enters the ports 138 and mixes with the gases supplied from the hose 132 to dilute the latter and reduce its temperature to the required extent. Particularly when the apparatus is used for heating oil contained in rubber tanks, and for other similar purposes, it is very desirable to dilute the gases discharged from the hose 132 to prevent scorching or burning of the tank or other equipment or apparatus being heated.

While the apparatus is in operation, the reigniter 126 is heated to a temperature sufficiently high to cause reignition of the combustible mixture supplied to the combustion chamber should the operator temporarily neglect to turn the crank 96 at sufficiently high speed to keep the flow of combustible mixture at a rate adequate to maintain the flame.

From the foregoing, it will appear that the apparatus of Figs. 5 to 8, as well as that shown in Figs. 1 to 4, provides a compact efficient apparatus for supplying a large quantity of heated air for local application to a part or apparatus to be heated, and that the apparatus is so simple and so constructed that it will operate satisfactorily over long periods of time. The apparatus is extremely light in weight compared to the heat output capacity thereof, so that it is practical to utilize it as an auxiliary heating apparatus for aircraft.

While I have shown and described particular embodiments of my invention, it will be apparent to those skilled in the art that the essential features thereof may be embodied in varied and modified forms. I therefore desire to include within the scope of the following claims, all such modifications and variations of the invention whereby substantially the results of the invention may be obtained through the use of substantially the same or equivalent means.

I claim:

1. In a portable emergency heating apparatus, a combination of a tank for liquid fuel, fuel and air mixing means carried by said tank, manually operated means for supplying air to said mixing means, said mixing means including a Pitot tube positioned so as to be responsive to the air flow rate from said manually operated means and extending to said tank for creating pressure on the fuel therein, a combustion chamber receiving the fuel and air mixture from said mixing means.

2. A portable heating apparatus comprising a blower, manually operable means for driving said blower, a fuel supply tank, a float bowl connected to receive fuel from said tank, a fuel burner supplied with air for combustion by said blower and fuel from said float bowl, means for supplying air under pressure from said blower to said tank thereby to cause fuel to flow to said float bowl, and means for supplying air under pressure from said blower to said float bowl thereby to cause fuel to flow to said burner.

3. A portable heating apparatus comprising a supporting framework, a fuel tank carried by said framework, a manually operable blower secured to said framework, a fuel burner, means for conducting air from said blower to said burner, a fuel level maintaining float bowl adjacent said burner, means for conducting fuel from said tank to said float bowl and from the latter to said burner, a pair of conduits each having one end subjected to the dynamic pressure of the air supplied by said blower, one of said conduits being connected to said fuel tank and the other of said conduits being connected to said float bowl, whereby fuel will flow under pressure from said tank to said float bowl and from said float bowl to said burner.

4. In an apparatus for heating an object by means of a blast of heated gases having a burner for the combustion of fuel, the combination therewith of a flexible extensible conduit having its inlet end connected to the burner for supplying gases to the object to be heated, and a nozzle at the outlet end of said conduit, said nozzle having a Venturi-shaped passageway for the flow of gases therethrough and having ports for the admission of atmospheric air to said gases for admixture therewith to reduce the temperature thereof.

LYNN A. WILLIAMS, JR.

REFERENCES CITED

The following references are of record in the file of this patent:

UNITED STATES PATENTS

| Number | Name | Date |
|---|---|---|
| D. 135,577 | Holthouse | Apr. 27, 1943 |
| 601,135 | Greenleaf | Mar. 22, 1898 |
| 864,062 | Ballintine | Aug. 20, 1907 |
| 884,888 | Bellows | Apr. 14, 1908 |
| 1,629,921 | Mansfield | May 24, 1927 |
| 1,669,614 | Hext | May 15, 1928 |
| 1,700,142 | Searle | Jan. 29, 1929 |
| 1,862,114 | Gilly | June 7, 1932 |
| 1,988,334 | Risinger | Jan. 15, 1935 |
| 2,110,209 | Engels | Mar. 8, 1938 |
| 2,286,855 | Holthouse | June 16, 1942 |
| 2,295,177 | King | Sept. 8, 1942 |